Patented Feb. 11, 1947

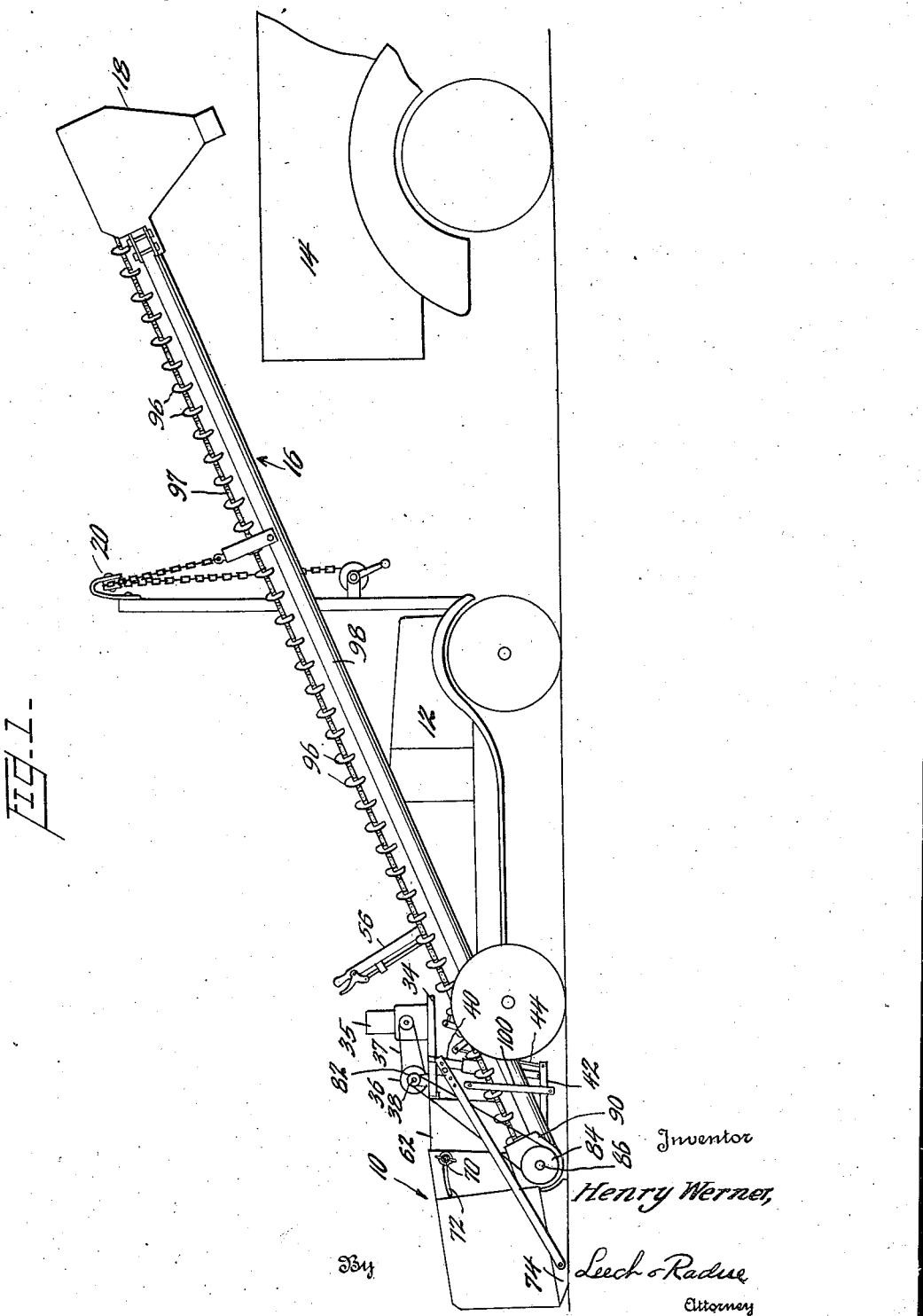

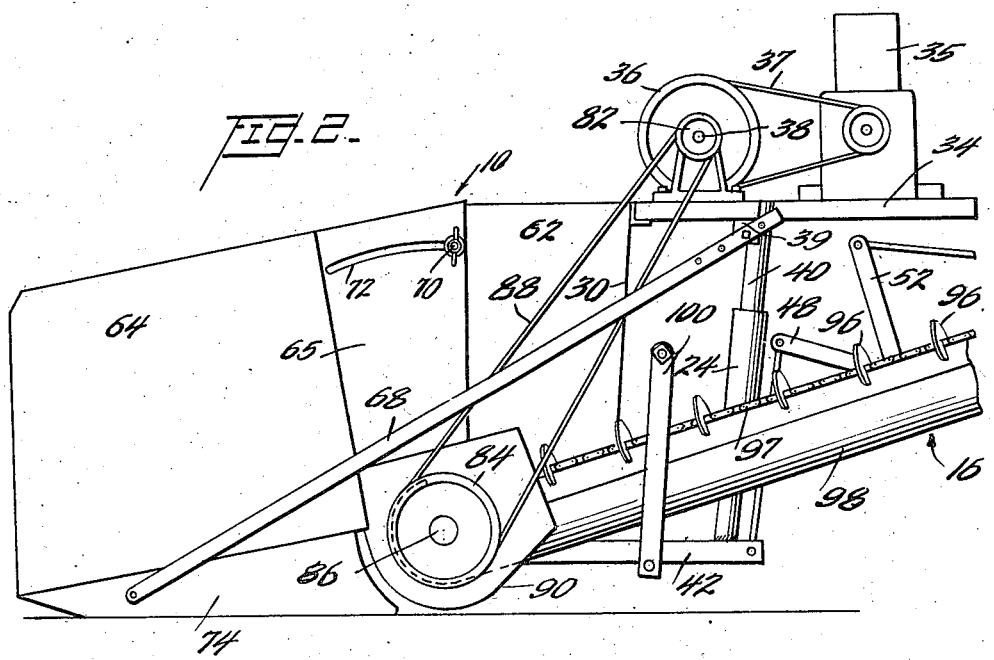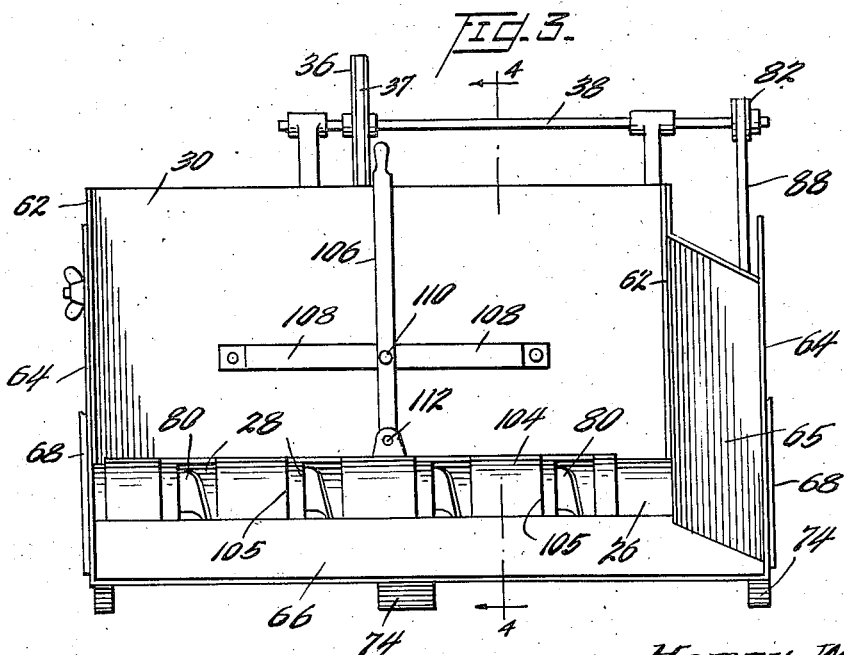

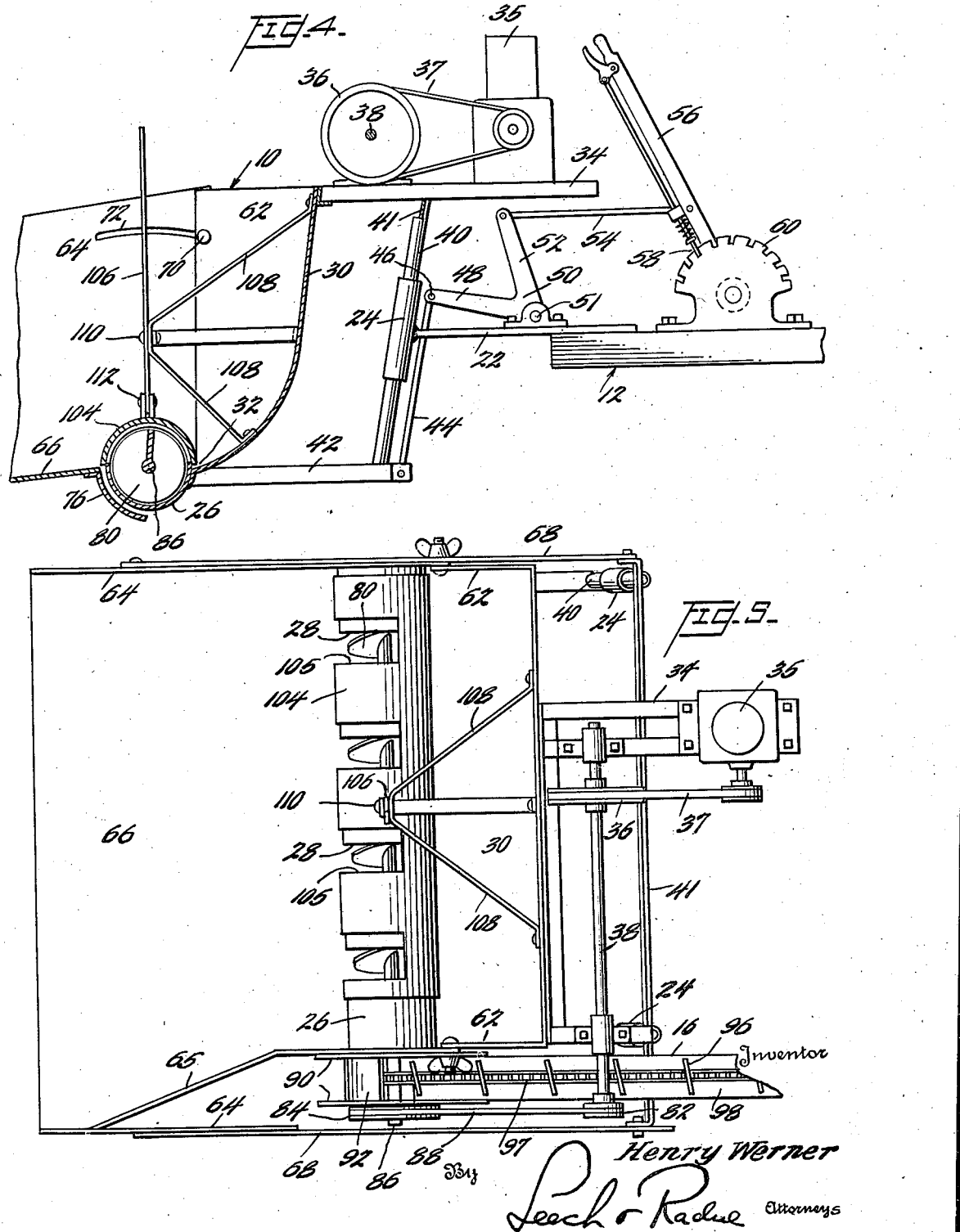

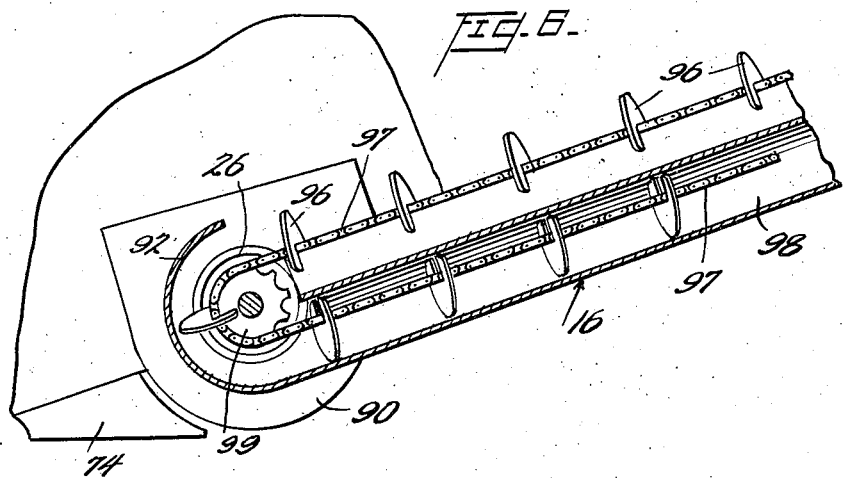
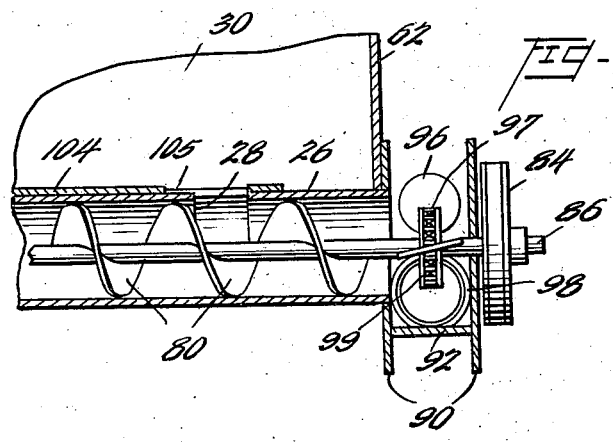
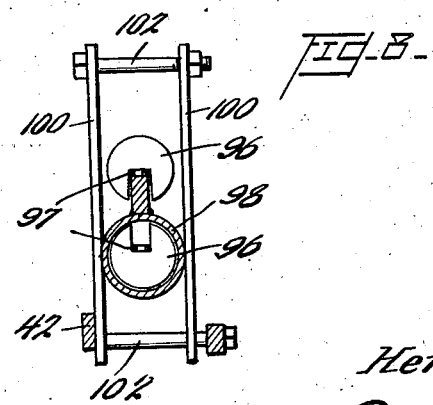

2,415,617

UNITED STATES PATENT OFFICE 2,415,617

PICKUP GRAIN LOADER

Henry Werner, Guymon, Okla.

Application February 5, 1945, Serial No. 576,192

7 Claims. (Cl. 198—7)

This invention relates generally to portable grain loading conveyors and more particularly to such a unit which may readily be attached to the frame of a tractor or a truck or car chassis.

Conveyor apparatus of this general type are quite well known in the art and, as a whole, are characterized by a number of undesirable features so as to limit their usefulness for the purpose intended. Such undesirable features include, among others, prohibitive initial costs, lack of flexibility of operation in the field, elaborate though not rugged construction and inconvenient arrangement of the various parts so as to require additional operating personnel.

The chief object of the present invention is to provide a readily portable grain loader which may be easily attached to or detached from tractors or truck or car chassis and which will eliminate the undesirable features of present grain loaders.

Another important object of the present invention is to provide a grain loader including a combination shovel and hopper which is adapted to pick up grain as a shovel from the surface of the ground or to be easily adjusted so as to receive the grain to be loaded in the hopper.

A further object of the present invention is to provide an improved pick-up grain loader, the shovel or hopper of which may be vertically adjusted for cross-country transportation or for selection of a desired layer of grain in a pile.

Other objects and advantages of the present invention will become apparent during the course of the following description.

In the drawings I have shown one embodiment of the invention. In this showing:

Fig. 1 is a view in elevation showing the grain loader comprising the present invention mounted on the frame of a car chassis and in operational position to deliver grain scooped from the surface of the ground to the receiving body of a truck;

Fig. 2 is a fragmentary side elevation to an enlarged scale of the apparatus shown in Fig. 1;

Fig. 3 is a front elevation of the combined shovel and hopper;

Fig. 4 is a vertical section partly in elevation taken on the line 4—4 of Fig. 3;

Fig. 5 is a plan view of the combination shovel and hopper and showing the feed screw shield which controls the flow of grain to the endless conveyor;

Fig. 6 is a vertical fragmentary longitudinal sectional view of the lower end of the endless conveyor;

Fig. 7 is a vertical transverse sectional view of the feed screw adjacent the lower end of the endless conveyor, and Fig. 8 is a front elevational view of the resilient straps which maintain the conveyor in proper position.

Referring now to the drawings it will be seen that the invention comprises a combination shovel and hopper generally designated 10 mounted on the chassis of an automobile 12 and adapted to feed grain scooped from a pile on the ground, etc., to a truck body 14 by means of an endless conveyor 16 equipped with a conventional discharge spout 18, the endless conveyor being supported by and pivotal with respect to the shovel at one end and adjustably mounted on the frame of the automobile 12 as at 20 by means of a block and tackle.

As disclosed in Figures 2, 3, 4 and 5 the shovel 10 is supported on the automobile by frame members 22 mounted at the rear and at opposite sides of the chassis. The forwardly (with respect to the shovel) extending members 22 are suitably braced transversely and rigidly support at their front ends a pair of tubular collars 24 for a purpose which will become apparent.

The shovel structure includes a transversely extending feed screw casing 26, the upper peripheral surface of which is provided with a series of spaced grain receiving openings 28. The back of the shovel 30 is welded at its bottom edge to the rear surface of the feed screw casing 26 as at 32 and extends arcuately backwardly and upwardly to support at its upper end one end of a platform 34 upon which is mounted a suitable small gas engine 35 and a power takeoff in the form of a pulley 36, belt 37 and a pulley shaft 38. The platform 34 is further supported intermediate its ends by a pair of vertically extending tubular members 40 mounted on opposite sides of the shovel and are connected and braced by a bar 41 at their upper ends and rigidly connected at their bottom ends by forwardly extending shovel frame members 42, the front ends of which are also rigidly secured to the feed screw casing 26. It will be noted that the back of the shovel 30, the forwardly extending portion of the platform 34, the tubular members 40 and the frame members 42 together form a rigid box frame which will adequately support the load of grain to be received within the shovel proper.

The tubular members 40 of the shovel supporting frame are slidably mounted within the tubular collars 24 for vertical adjustment of the shovel 10 with respect to the ground. The frame members 42 extend rearwardly past their connection with tubular members 40 and have mounted on these projections a vertically extending pair of rods 44 which are connected transversely by a rod 46 having pivotal connection with one arm 48 of the bell crank 50. The bell crank 50 is pivotally mounted on shaft 51 which is journalled in brackets on the frame connections 22. The crank 50 is pivotally connected by its other arm 52 and connecting member 54 to an operating lever 56 which may be actuated to raise or lower the shovel 10 to any desired degree of adjustment with respect to the ground and maintained therein by engagement of the pawl 58 in the actuating lever 56 with the notches in the arcuate segment 60 which is suitably mounted on the members 22 or the chassis of the automobile.

The shovel 10 is provided with a pair of sides 62 joined integrally with the feed screw casing 26 and the shovel back 30. The sides 62 project forwardly in the shovel a short distance beyond the casing 26 and additional side sections 64 are integrally mounted on the bottom 66 of the shovel which is pivotally mounted about the ends of the casing 26 so as to have rotary movement with respect thereto. The adjusted rotary position of the shovel bottom 66 and its integral sides 64 with respect to the feed screw casing 26 and the back 30 of the shovel is attained by varying the length of a pair of supporting straps 68 which are connected to the shovel at their lower ends and have an adjustable connection at their upper ends with the transverse frame member 41. The sides 64 and 65 are maintained flush against the sides 62 by means of a nut and bolt 70 projecting through an aperture in each of the sides 62 and having arcuate movement in the slots 72 provided in the sides 64 and 65.

The underside of the shovel bottom 66 is provided with a plurality of skid members 74 to facilitate the picking up of the grain from the surface of the ground and to guard the bottom 66 against excessive wear. Integrally mounted on the rear edge of the floor 66 is an arcuate shield portion 76 which conforms to the curvature of the feed screw casing 26 for a purpose which will become apparent.

A feed screw 80 is mounted for rotation within the casing 26 and is driven by means of the pulleys 82 and 84 mounted respectively on shafts 38 and 86 and connected by a suitable belt 88. The feed screw and its enclosing casing 26 project through and terminate at the side wall 62 of the shovel and also through one of a pair of housing side wall members 90 which enclose, together with an arcuate plate 92, the lower end of the endless conveyor 16. The endless conveyor (see Figs. 2, 5, 6, 7 and 8) includes the usual plurality of spaced flight members 96 which are circular in nature and which, when moving from the housing 92 to the delivery spout 18, pass through a closed tubular member 98. This insures the delivery of grain picked up or scooped up in the shovel 10, thence delivered by the screw feed 80 to the housing 92, and thence by the flights 96 to the delivery spout 18 without any possible loss thereof. The tubular member 98 is made integral with the housing plate 92 and side plates 90 and the latter are journalled on the feed screw pipe 26 and on the feed screw shaft 86 so as to be pivotable thereabout when the upper end of the endless conveyor is raised by means of the block and tackle 20 so as to accommodate the delivery spout 18 to whatever heights are desired.

The pivotal adjusting movement of the conveyor shaft 98 about the feed screw shaft 86 in a vertical direction is laterally constrained by a pair of spaced parallel strap members 100, one of which is welded at its lower end to the shovel frame member 42, the straps 100 being spaced apart by suitable transverse members 102 which limit but permit free pivotal movement. It will be further noted in Figs. 5 and 6 that the conveyor flights 96 which are mounted in spaced relationship on the usual chain 97 passes over chain sprocket 99 which is suitably journalled on the feed screw shaft 86. A similar sprocket is suitably mounted at the upper end of conveyor 94.

Due to the necessity for the positioning of the lower end of the endless conveyor in cooperating relationship with the discharge end of the feed screw 80, the length of the feed screw included between the sides 62 is of lesser length than the width of the shovel at its front edge. Accordingly, an auxiliary side member 65 is integrally secured to the right hand side of the shovel as viewed in Fig. 3 to direct grain picked up from the ground during the shovelling operation to the spaced openings in the feed screw casing 26. It will be noted that the right hand side 64 is continued forwardly in a conventional manner and serves to prevent foreign matter from accidentally entering within the conveyor housing 92. It will be further seen that the arcuate guard plate 76 which is secured to the lower rear edge of the shovel bottom 66 serves to prevent the loss of grain from the apertures 28 in the casing 26 when the shovel 66 has been pivoted upwardly into its position for use as a grain receiving hopper.

In order that the flow of grain scooped up in the shovel (or received therewith when it is being used as a hopper in its upwardly adjusted position) may be regulated, an arcuate shield 104 is positioned within the shovel upon the casing 26 and conforms therewith. The shield 104 is also provided with a series of transversely spaced arcuate openings 105 which in full feed position coincide exactly with the peripheral openings 28 in the casing 26. A flow control member 106 pivoted on suitable braces at 108 as at 110 has a pivotal connection with upwardly projecting lug 112 integrally mounted on the shield 104.

It will thus be seen that the flow of grain through the apertures 28 to the feed screw may be decreased by swinging the flow control handle 106 to the right as viewed in Figure 3 so as to slide the shield 104 to the left so as to obstruct to an increasing degree the openings 28. As shown these openings are about one-third obstructed and due to the nature and construction of the parts involved, the flow control handle 106 and the corresponding position of the shield 104 will remain in the adjusted position until such position is deliberately changed.

It will readily be appreciated that as the car 12 supporting the present invention is backed along a windrow with the shovel 10 in its lower position, the grain can be picked up from the ground and fed through the openings 28 to the feed screw 80 and thence into the conveyor housing 92 to be picked up by the flights 96 and delivered to the discharge spout 18 in a most expeditious manner. When it is desired to use the shovel as a hopper to receive the grain to be loaded, the shovel bottom 66 and its integral sides 64 and 65 are pivoted upwardly on the feed screw shaft 86 about the casing 26 as secured to its upper position as previously described. In this position due to the now rearwardly sloping bottom of the shovel and the arcuate sloped nature of the back of the shovel, all grain delivered to the shovel in its use as a hopper will be directly fed to the feed screw 80, into the endless conveyor housing 82, and thence by the flights 66 to the delivery spout 18 as before.

The convertible feature of the invention, that is, the adjustment from a shovel to a hopper or vice versa, is highly important and increases its versatility in use in the field adapting it for all of the normal grain loading operations that arise. Moreover, the adjustability of the combined shovel and hopper in a vertical direction with respect to the frame of the chassis upon which it is mounted is also highly important in that the vertical height of the shovel from the ground may be adjusted in use as desired, as may the vertical height thereof when being used as a grain receiving hopper. Obviously, this simple vertical adjustment of the shovel is highly advantageous in transporting the equipment from field to field.

It will now be appreciated that the present invention provides a highly versatile grain loading apparatus readily adapted for use as a shovel or hopper and which is provided with further important features such as regulation for the feeding of grain thereto and guard means for preventing the entering of extraneous or foreign matter into the mechanism. The whole unit may be readily powered by a small two or three horse power gas engine or it may be run from a power takeoff such as the usual tractor power take-off.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A grain loader of the type described comprising a frame for attachment to a vehicle, a shovel mounted on said frame, a pipe having spaced apertures mounted in the bottom of said shovel and extending transversely thereof and through one side thereof, an endless conveyor mounted on the vehicle and operatively connected with said shovel adjacent said pipe, and a feed screw mounted for rotation in said pipe and adapted to feed grain received in said shovel to said conveyor, said grain loader including lift mechanism mounted on said frame and constructed and arranged to effect vertical sliding adjustment of said shovel with respect to said frame.

2. A grain loader of the type described comprising a frame for attachment to a vehicle, a shovel having a bottom, sides and back mounted on said frame, a pipe having spaced apertures mounted in the bottom of said shovel and extending transversely thereof and through one side thereof, an endless conveyor mounted on the vehicle and operatively connected with said shovel adjacent said pipe, and a feed screw mounted for rotation in said pipe and adapted to feed grain received in said shovel to said conveyor, the bottom of said shovel being adjustable toward said back of said shovel into a grain receiving hopper.

3. A grain loader of the type described comprising a frame for attachment to a vehicle, a shovel mounted on said frame, a pipe having spaced apertures mounted in the bottom of said shovel and extending transversely thereof and through one side thereof, an endless conveyor mounted on the vehicle and operatively connected with said shovel adjacent said pipe, a feed screw mounted for rotation in said pipe and adapted to feed grain received in said shovel to said conveyor, said shovel including a bottom, sides and a back, the rearward portion of the sides being integral with said back and said pipe, and the forward portions of said sides being integral with said bottom for relative rotary movement with respect to said pipe to convert said shovel into a grain receiving hopper.

4. A grain loader of the type described comprising a frame for attachment to a vehicle, a shovel mounted on said frame, a pipe having spaced apertures mounted in the bottom of said shovel and extending transversely thereof and through one side thereof, an endless conveyor mounted on the vehicle and operatively connected with said shovel adjacent said pipe, and a feed screw mounted for rotation in said pipe and adapted to feed grain received in said shovel to said conveyor, said attaching frame including a pair of rigid tubular collars adapted to slidably receive the frame of said shovel therein and lift mechanism mounted on said attaching frame and connected to said shovel frame to effect vertical adjustment thereof in said collars.

5. A grain loader of the type described comprising a frame for attachment to a vehicle, a shovel mounted on said frame, a pipe having spaced apertures mounted in the bottom of said shovel and extending transversely thereof and through one side thereof, an endless conveyor mounted on the vehicle and operatively connected with said shovel adjacent said pipe, a feed screw mounted for rotation in said pipe and adapted to feed grain received in said shovel to said conveyor, said shovel including a bottom, sides and a back, the rearward portion of the sides being integral with said back and said pipe, the forward portions of said sides being integral with said bottom for relative rotary movement with respect to said pipe to convert said shovel into a grain receiving hopper, and a guard member mounted on the bottom of said shovel adjacent said pipe and operative to close exposed portions of said apertures when said shovel bottom has been pivoted toward its hopper forming position.

6. A grain loader of the type described comprising a frame for attachment to a vehicle, a shovel having a bottom, sides and back mounted on said frame, a pipe having spaced apertures mounted in the bottom of said shovel and extending transversely thereof and through one side thereof, an endless conveyor mounted on the vehicle and operatively connected with said shovel adjacent said pipe, a feed screw mounted for rotation in said pipe and adapted to feed grain received in said shovel to said conveyor, said shovel being of greater width at its front edge than at said pipe, an additional side mounted on the bottom of said shovel and extending rearwardly from one corner of said edge to form a protective side shield for the lower end of said conveyor and the projecting pipe.

7. A grain loader of the type described comprising a frame for attachment to a vehicle, a combined shovel and hopper mounted on said frame, a pipe having spaced apertures mounted in the bottom of said shovel and extending transversely thereof and through one side thereof, an endless conveyor mounted on the vehicle and operatively connected with said shovel adjacent said pipe, a feed screw mounted for rotation in said pipe and adapted to feed grain received in said shovel to said conveyor, and means adjustably mounted on said pipe to simultaneously regulate the flow of grain through each of said apertures.

HENRY WERNER.

REFERENCES CITED

The following references are of record in the file of this patent:

UNITED STATES PATENTS

| Number | Name | Date |
|---|---|---|
| 797,100 | Crosby | Aug. 15, 1905 |
| 1,274,556 | Jons | Aug. 6, 1918 |
| 1,505,476 | London | Aug. 19, 1924 |
| 1,644,204 | Pray | Oct. 4, 1927 |
| 1,700,922 | Coon | Feb. 5, 1929 |
| 2,208,128 | Holbrook et al. | July 16, 1940 |
| 2,364,282 | Fees | Dec. 5, 1944 |
| 2,390,286 | Adams (1) | Dec. 4, 1945 |
| 1,117,619 | Adams (2) | Nov. 17, 1914 |

FOREIGN PATENTS

| Number | Country | Date |
|---|---|---|
| 605,891 | German | Nov. 20, 1934 |